March 18, 1952     O. F. QUARTULLO     2,589,863
GASOLINE-ELECTRIC DRIVE FOR VEHICLES
Filed Dec. 6, 1946     3 Sheets-Sheet 1
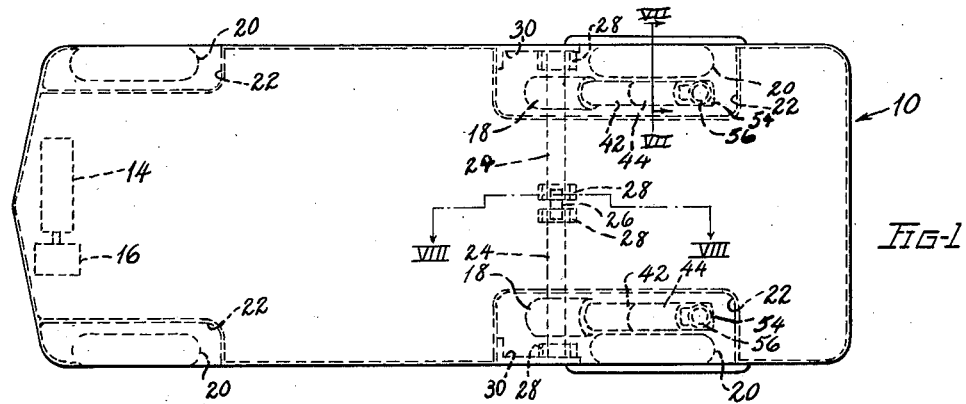
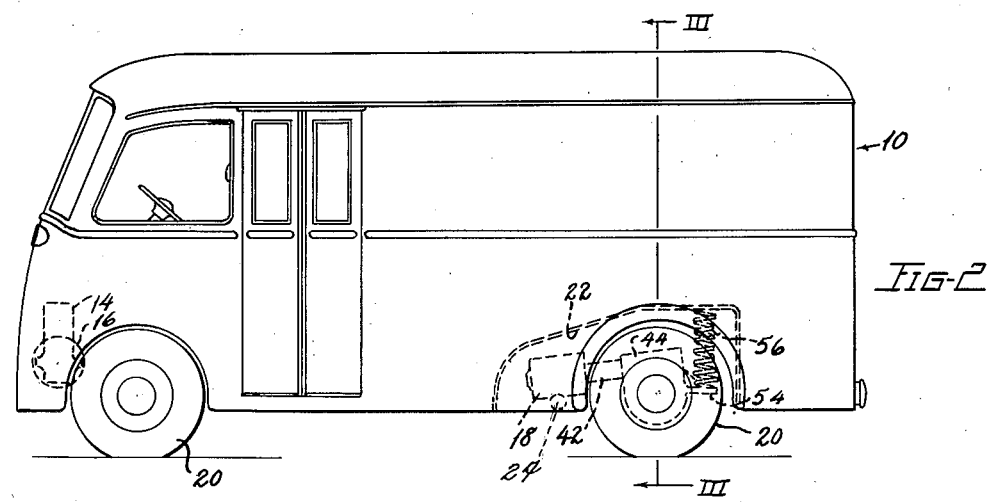
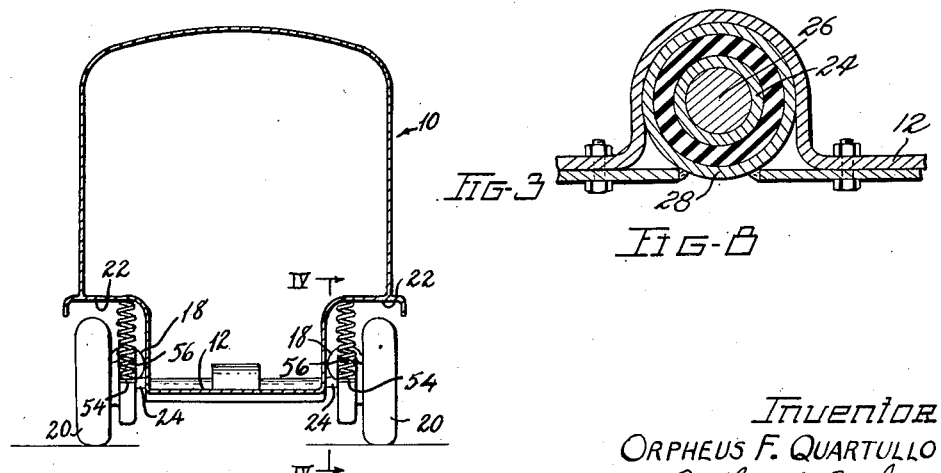
Inventor
ORPHEUS F. QUARTULLO
By Oldham & Oldham
Att'ys March 18, 1952     O. F. QUARTULLO     2,589,863
GASOLINE-ELECTRIC DRIVE FOR VEHICLES
Filed Dec. 6, 1946     3 Sheets-Sheet 2
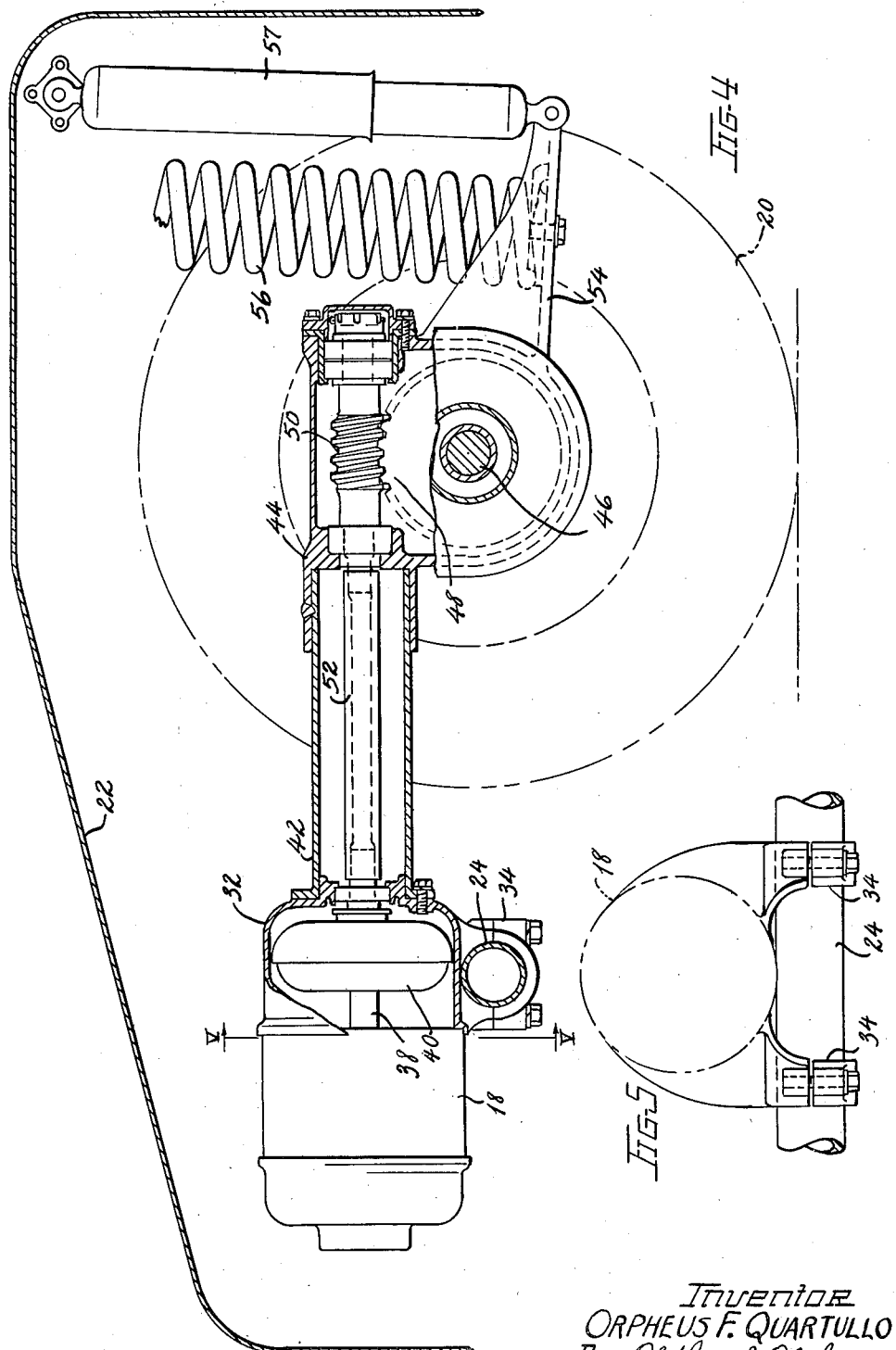
Inventor
ORPHEUS F. QUARTULLO
By Oldham & Oldham
Attys March 18, 1952     O. F. QUARTULLO     2,589,863
GASOLINE-ELECTRIC DRIVE FOR VEHICLES
Filed Dec. 6, 1946     3 Sheets-Sheet 3

Inventor
ORPHEUS F. QUARTULLO
By Oldham & Oldham
Attys

Patented Mar. 18, 1952

2,589,863

UNITED STATES PATENT OFFICE 2,589,863

GASOLINE-ELECTRIC DRIVE FOR VEHICLES

Orpheus F. Quartullo, Cleveland, Ohio

Application December 6, 1946, Serial No. 714,398

3 Claims. (Cl. 180—65)

This invention relates to gasoline-electric drives for vehicles, and, more particularly, to improvements in the individual springing of vehicle wheels, and to improvements in mounting the electric motor to drive the independently sprung wheel.

Gasoline-electric drives for vehicles have been suggested heretofore, but known installations have been expensive, cumbersome, space-consuming, and subject to mechanical or electrical failure and breakdown. It has even been proposed to employ in vehicles such as milk or package delivery trucks gasoline-electric combinations, but in these structures it has always been extremely difficult to provide flat floors or bottoms which facilitate storage of milk bottle cases or packages. Still again, known gasoline-electric drives substantially always include elaborate electric control mechanism between the generator and the electric motor, with the generator being driven at a constant speed. Such controls are heavy and expensive. It has also been thought necessary to use series wound, induction, or other motors having high starting torque characteristics, but these motors are relatively expensive.

It is the general object of my invention to avoid and overcome the foregoing and other difficulties of and objections to prior known practices, by the provision of a gasoline-electric drive characterized by simplicity, lightness of weight, inexpensiveness, durability, and efficiency.

Another object of my invention is to provide a vehicle, such as a milk or package delivery truck having a relatively flat floor or bottom extending substantially from the front to the rear of the vehicle, and almost completely from side to side, the bed being substantially on the level of the axes of the vehicle wheels.

Another object of my invention is the provision of an improved individual springing mechanism for a vehicle wheel, the mechanism incorporating an electric motor and a mechanical drive from the motor to the wheel.

Another object of my invention is the provision of the combination described in the preceding paragraph, but including a fluid clutch or other hydraulic torque converter between the electric motor and the wheel which permits the use of an ordinary, inexpensive, low starting torque type of electric motor in a gasoline-electric drive.

The foregoing objects of my invention, and other objects which will become apparent as the description proceeds, are achieved by the provision in combination in a vehicle, of an elongate, generally rectangular body, an independently mounted wheel adjacent each corner of the body, the body having a flat floor substantially at the level of the wheel axles and extending from the rear of the body almost to the front of the vehicle, an internal combustion engine mounted in the front of the body, an electric generator driven by the engine, an electric motor associated with each rear wheel, gear mechanism connecting each motor with its associated rear wheel, each of the motors including a stator housing, the gear mechanism having a casing journaling the wheel, a torque tube connecting the stator housing with the gear casing, a drive shaft positioned inside of the torque tube and connecting the motor with the gear mechanism, resilient means between the gear casing and the vehicle body, and means pivotally securing the stator housing to the vehicle body. The combination may include a fluid clutch interposed in the drive between the motor and the gear mechanism.

For a better understanding of my invention reference should be had to the accompanying drawings, wherein:

Fig. 1 is a plan view of a vehicle incorporating the features of the invention;

Fig. 2 is a side elevation of the vehicle shown in Fig. 1;

Fig. 3 is a vertical cross-sectional view through the vehicle taken substantially on line III—III of Fig. 2;

Fig. 4 is an enlarged vertical sectional view, the plane of the section running from front to rear of the vehicle, and illustrating the details of the rear wheel mounting and drive, substantially as taken on line IV—IV of Fig. 3;

Fig. 5 is a diagrammatic vertical sectional view taken on line V—V of Fig. 4;

Fig. 8 is a cross-sectional view taken on line VIII—VIII of Fig. 1.

Figure 6:
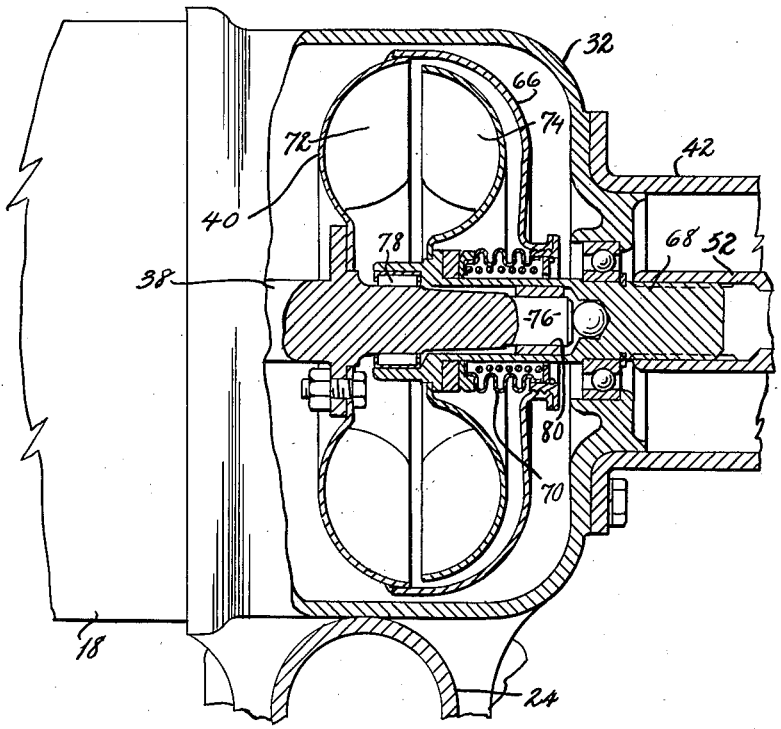
Fig. 6 is an enlarged diametric sectional view taken through the fluid clutch incorporated in the drive.

It will be appreciated that the principles of my invention can be employed in conjunction with substantially any known type of vehicle with attending advantages of space saving, simplicity, reduction of cost, and the like. However, many of the features of the invention are particularly advantageous when employed in the construction of a delivery truck, for example, a milk delivery truck, and, accordingly, the invention has been specifically illustrated in conjunction therewith, and will be so described.

In the drawings, and having particular reference to Figs. 1 to 3, the numeral 10 indicates, as a whole, a vehicle body of generally rectangular shape in horizontal section, and of a substantially square shape in vertical section. Any necessary strengthening means for the body may be incorporated therewith, but in order to simplify the illustration of the invention these have not been shown in the drawing. The body, of course, can be made of any of a variety of materials, including wood, sheet metal, ply wood, or other laminates.

An important feature of the invention is that the bottom of the body, namely, the floor, indicated by the numeral 12, is flat and extends from the front to the rear of the body and substantially from side to side thereof at a relatively low level which is particularly beneficial in delivery vehicles where the operator of the vehicle may have to get in and out of the vehicle many times during a trip, and, also, for the reason that any packages, bottle cases, and the like, which are stored in the vehicle, can be readily positioned in or removed from the vehicle with a minimum of lifting or effort on the part of the operator. In conventional vehicles as exemplified in the prior art the floor level is almost universally above the rotary axes of the wheels, however, it will be noted that in the present invention the level of the floor 12 of the body is readily placed at or below the rotatable axes of the vehicle wheels. This insures a minimum of lifting by the operator, as before noted. Also, the vehicle bumpers can be positioned below the floor line to be sure the operator does not have to lift packages over the bumpers.

Positioned in the front of the vehicle is an internal combustion engine 14, and in order to save space, the engine 14 is positioned to extend transversely of the vehicle adjacent the very front thereof. The internal combustion engine 14 drives an electric generator 16 which supplies electric power to electric motors 18 associated with one or more of the vehicle wheels, for example, the rear wheels.

Each of the wheels 20, which are conventional, pneumatic tire wheels, are received in wells 22 formed in the vehicle body in the manner shown in Figs. 1 to 3. The wheels are independently sprung, and with respect to the two front wheels this is done in any known or conventional manner. The rear wheels are independently sprung in accord with the principles of the invention and in a manner which will now be described.

Having reference to Figs. 1, 4, and 5, the numerals 24 indicate hollow shafts, each extending substantially half way across the vehicle, the adjacent ends of the hollow shaft being aligned, but not connected, with an aligning pin 26 extending into the ends of the adjacent shafts. Each end of each shaft 24 is supported for limited rotary movement in rubber torque bushings 28, the rubber bushings 28 at the outside ends of the shaft 24 being supported in brackets 30 mounted on the body 10.

Each rear wheel is mounted in oscillating association with one of the shafts 24, and this is achieved by providing a housing 32 (see Fig. 4) having bracket portions 34 at spaced points on the housing which clamp on the shaft 24 in the manner best seen in Fig. 5. At one end the housing 32 is machined to snugly receive and support the stator case of the electric motor 18, or, if so desired, the brackets 34 may be directly associated with the stator housing of the motor 18. If a series wound motor 18 is employed, which has high starting torque, then the use of a separate housing 32 is not necessary. On the other hand, when the housing 32 is employed, it is possible to employ an electric motor 18 which does not have high starting torque characteristics, with the armature shaft 38 of the motor extending to and connecting to one side of a fluid converter 40 contained in the housing, the fluid converter being either in the form of a fluid clutch, or a hydraulic converter. The other end of the housing 32 is secured to a torque tube 42 whose other end is fastened to a casing 44 which contains suitable gear mechanism for driving the wheel 20, the wheel being carried on an axle 46 journaled in the casing 44. Conveniently, the axle 46 carries a worm gear 48 which is engaged by a worm 50, likewise journaled in the casing 44, the end of the worm gear being connected by a shaft 52 with the other side of the fluid converter 40.

The casing 44 is preferably formed with an integral bracket or shelf 54 which engages with one end of a compression spring 56, the other end of the spring 56 contacting the body or a body frame member of the vehicle. The spring 56, acting in conjunction with the rubber torsion bushings 28 mounting the shaft 24 supports the wheels 20 for resilient, cushioned, arcuate swinging movement about the shafts 24. Usually shock absorbers 57 are incorporated in the assembly as shown in Fig. 4. As an alternative to the springing structure described, the invention contemplates eliminating the springs 56 and making the rubber bushings 28 sufficiently large to support the wheels in resilient cantilever fashion.

Figure 7:
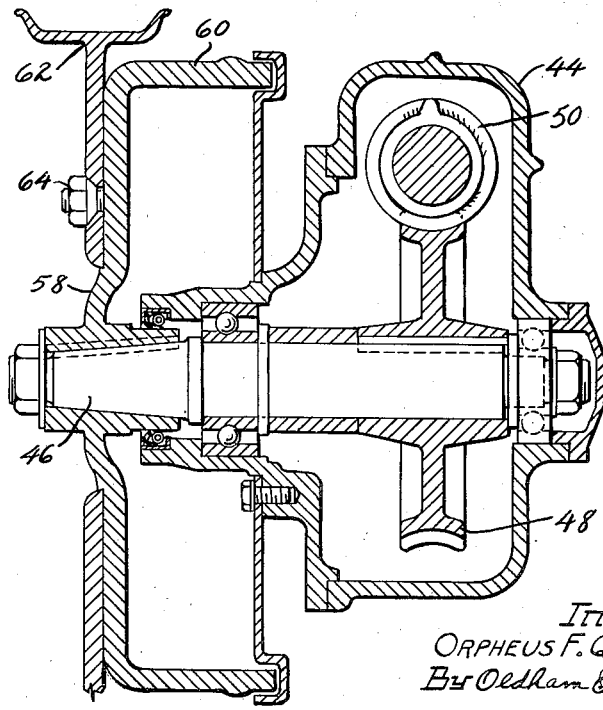
Fig. 7 is an enlarged vertical sectional view taken substantially on line VII—VII of Fig. 1.

In Fig. 7 the details of the casing 44, the journaling of the axle 46 in the casing, and of the worm and worm gear, are illustrated. Also, I have illustrated a wheel hub 58, having an integral brake drum 60, with a wheel and rim 62 being removably secured to the hub 58 by bolts 64.

In Fig. 6 I have illustrated in greater detail the construction of the fluid clutch 40, which, as already noted, is preferably employed between the motor shaft 38 and the drive shaft 52 so that an electric motor having lower starting torque characteristics may be employed. The fluid clutch 40 may take the form of a fluid clutch or a hydraulic torque converter of known and conventional type, the shell 66 of the converter being extended around to a point adjacent the shaft 52. More specifically, a stub connector shaft 68 is associated with the converter 40, with the shaft 68 connecting between the motor shaft 38 and the drive shaft 52. A suitable sylphon and spring mechanism 70 acts to seal between the shell 66 and the stub shaft 68. Of course, the shell 66 carries certain blades 72 of substantially conventional design, and a bladed wheel 74, also of conventional design, is secured to the stub shaft 68 to establish the fluid drive or hydraulic torque converter alignment between the motor shaft 38 and the stub shaft 68 and drive shaft 52. The stub shaft 68 is formed with a suitable bore and bearing adjacent the wheel 74 to rotatably receive the reduced end 76 of the motor shaft 38. Bearings 78 and 80 are provided in the manner shown.

An important feature of the invention is that the operator of the vehicle feeds gasoline or other fuel to the engine 14 in conventional manner through a foot or hand accelerator. The engine 14 thus is driven at any of a variety of desired speeds to drive the electric generator 16 to produce desired voltages and electric currents which are transmitted to the electric motors 18 by any suitable electric cables, which cables for the sake of simplicity have not been illustrated on the drawings. This manner of controlling the flow of electric current to the motors 18 eliminates heavy and expensive electric control equipment of the type which has been necessary heretofore in dropping electrical voltages and currents to lower amounts used for starting a vehicle.

From the foregoing it will be recognized that the various objects of my invention have been achieved by the provision of a vehicle characterized by simplicity, lightness in weight without sacrifice of strength or durability, the greatest utilization of vehicle body space, and the provision of a flat floor extending from substantially the front to the rear of the vehicle and from side to side and on a level, if desired, as low as the axes of the wheels. Complicated electrical control equipment is eliminated, and the use of expensive high starting torque electric motors are avoided.

While in accord with the patent statutes, one embodiment of the invention has been specifically illustrated and described, it is to be particularly understood that I am not to be limited thereto or thereby, but that the scope of my invention is defined in the appended claims.

I claim:

1. In combination in a vehicle, a body, a motor associated with each rear wheel, worm and worm gear mechanism connecting each motor with its rear wheel, each of said motors including a stator housing, the worm and worm gear mechanism including a casing journaling the wheel, a torque tube connecting the stator housing with the casing, a drive between the motor and the worm, a fluid clutch interposed in the drive, resilient means between the casing and the body, and means pivotally securing the stator housing to the body and including a separate transversely extending member for each said stator housing and aligning means engaging said members to aid in positioning same while permitting individual arcuate movement thereof.

2. In combination in a vehicle, a pair of wheels, a short stub axle for each wheel to which the wheel is removably secured, a casing journaling each of the axles, a torque tube rigidly secured to each of the casings and extending substantially at right angles to the axle, a motor having a housing rigidly secured to the other end of each of the tubes, a shaft connected to the rotary part of each motor and extending through its tube into the casing secured thereto, gearing in each casing and connecting the shaft to the axle therein, a pair of members positioned substantially laterally and horizontally of the vehicle in laterally spaced but aligned relation, rubber torsion bushings securing the members to the vehicle, means securing the motor housing individually to the different members, and means connected between the adjacent ends of said members to maintain same in alignment but to permit individual arcuate movement of same.

3. In combination in a vehicle, a pair of wheels, a short stub axle for each wheel to which the wheel is removably secured, a casing journaling each of the axles, a torque tube rigidly secured to each of the casings and extending substantially at right angles to the axle, a motor having a housing rigidly secured to the other end of each of the torque tubes, a shaft connected to the rotary part of each motor and extending through its tube into the casing secured to such torque tube, means in each casing and connecting the shaft to the axle in such casing, a pair of members positioned to extend substantially laterally and horizontally of the vehicle in aligned but spaced relation, torsion means securing the members to the vehicle, means securing the motor housing individually to the members, and means extending between the adjacent ends of said members to maintain same in alignment but to permit individual arcuate movement of same.

ORPHEUS F. QUARTULLO.

REFERENCES CITED

The following references are of record in the file of this patent:

UNITED STATES PATENTS

| Number | Name | Date |
|---|---|---|
| 1,111,510 | Ward | Sept. 22, 1914 |
| 1,664,305 | McCleary | Mar. 27, 1928 |
| 1,709,255 | Fielder | Apr. 16, 1929 |
| 1,960,140 | Church | May 22, 1934 |
| 2,131,083 | Winn | Sept. 27, 1938 |
| 2,215,182 | Latshaw | Sept. 17, 1940 |
| 2,221,705 | Glynn, Jr. | Nov. 12, 1940 |
| 2,270,571 | Woolson et al. | Jan. 20, 1942 |
| 2,286,609 | Ledwinka | June 16, 1942 |
| 2,336,386 | Beck | Dec. 7, 1943 |
| 2,367,817 | Brown | Jan. 23, 1945 |
| 2,381,187 | Swift | Aug. 7, 1945 |

FOREIGN PATENTS

| Number | Country | Date |
|---|---|---|
| 427,392 | Great Britain | Apr. 12, 1935 |
| 502,313 | Great Britain | Mar. 15, 1939 |
| 542,498 | Great Britain | Jan. 12, 1942 |
| 816,329 | France | Aug. 5, 1937 |